United States Patent Office 3,315,939
Patented Apr. 25, 1967

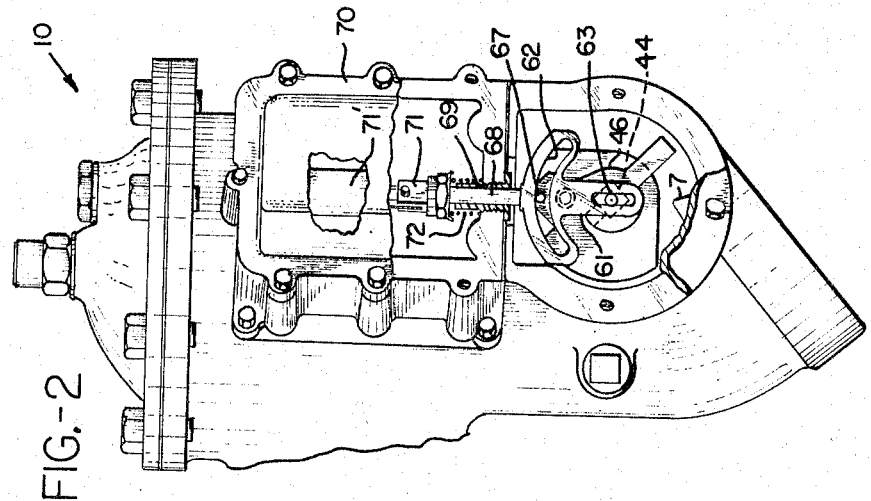
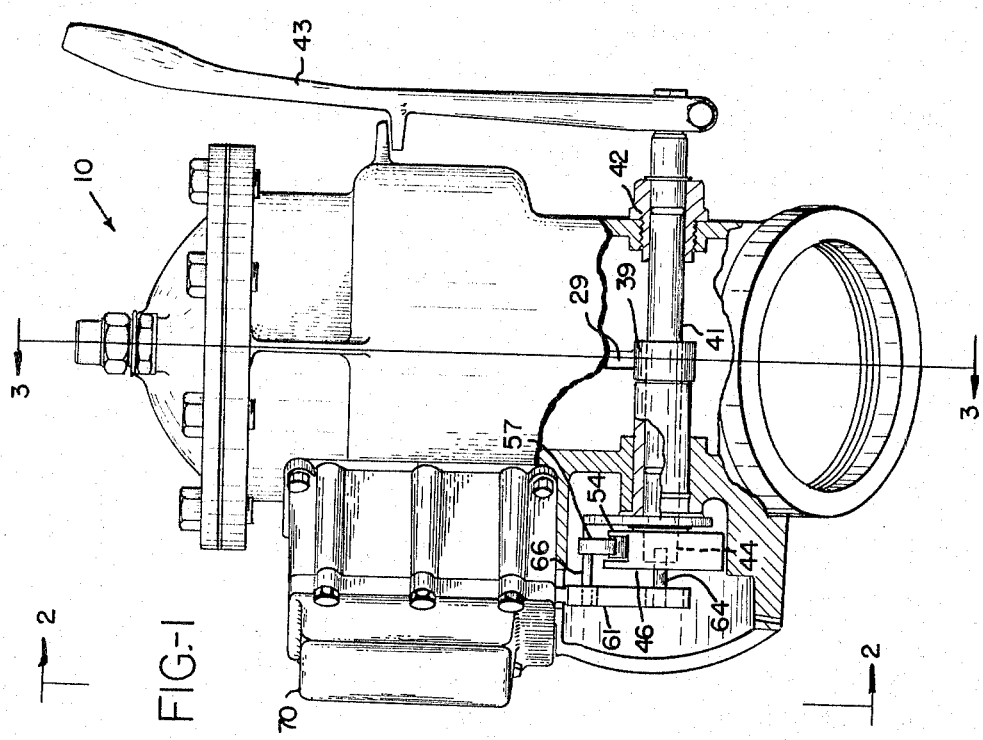

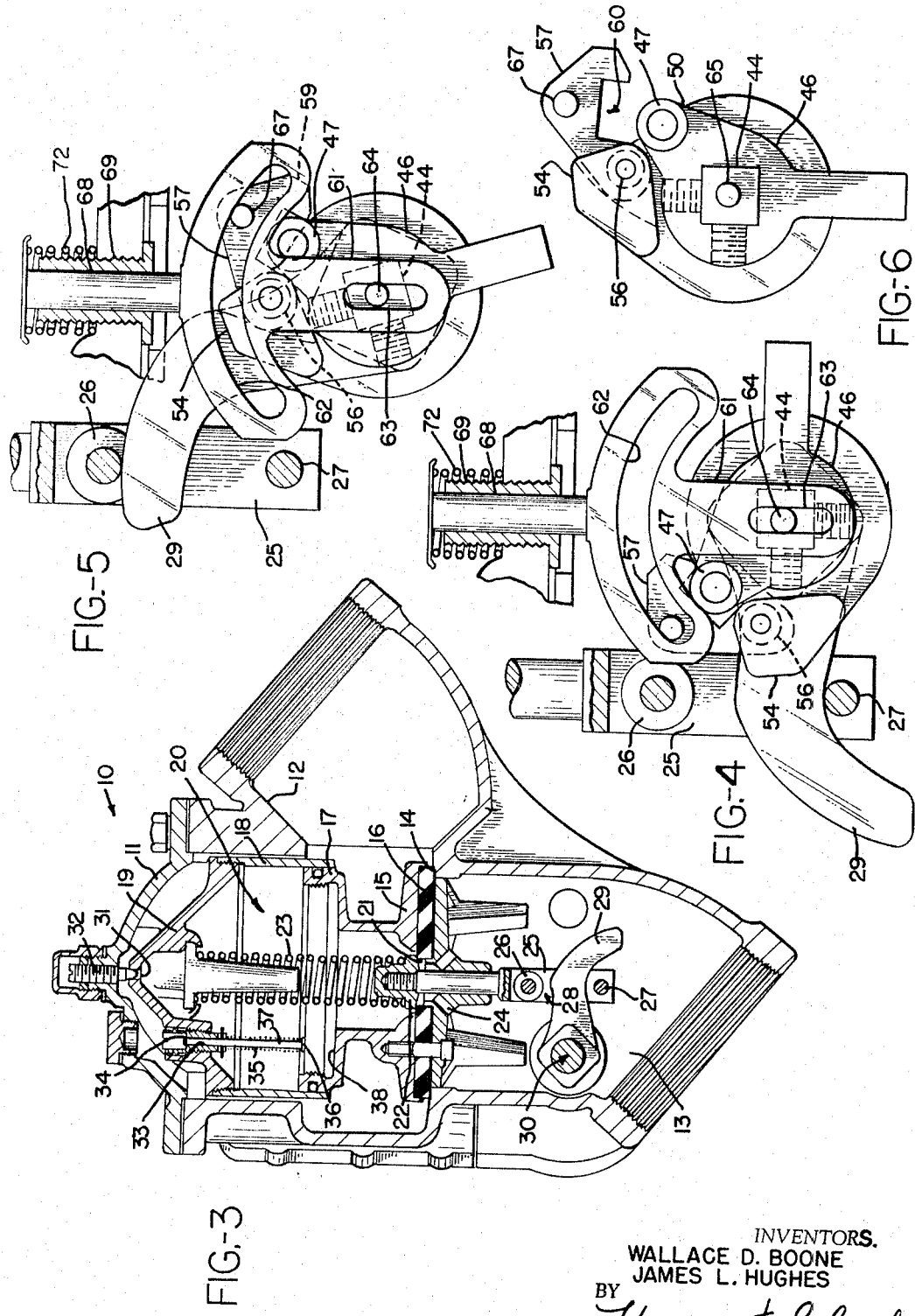

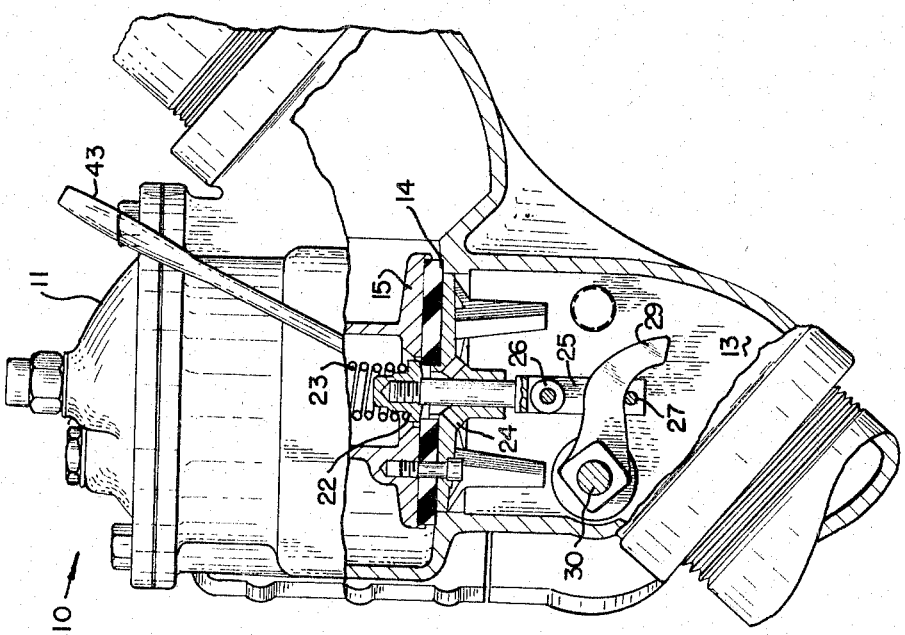
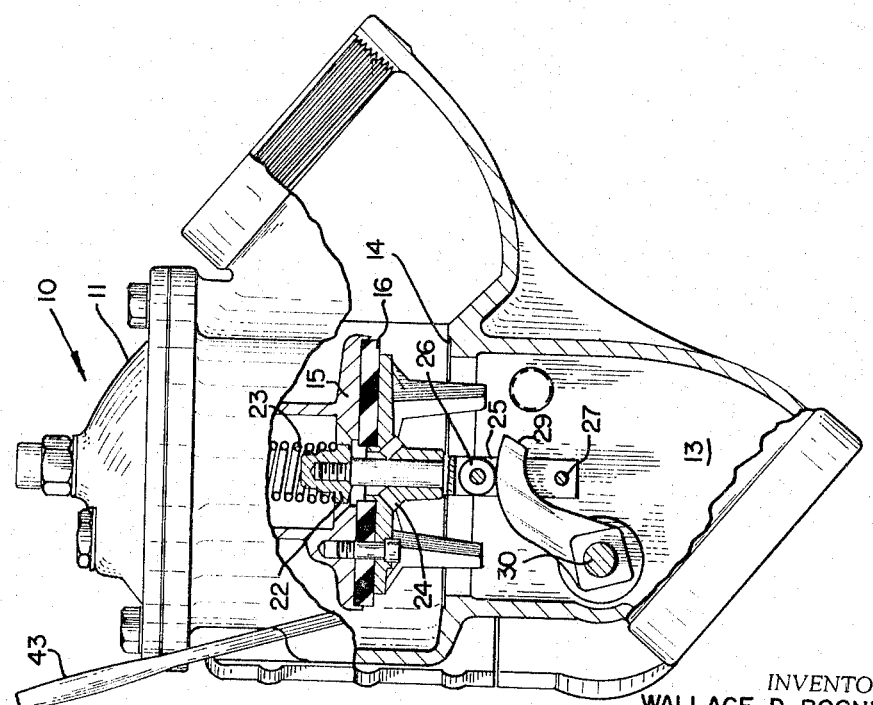

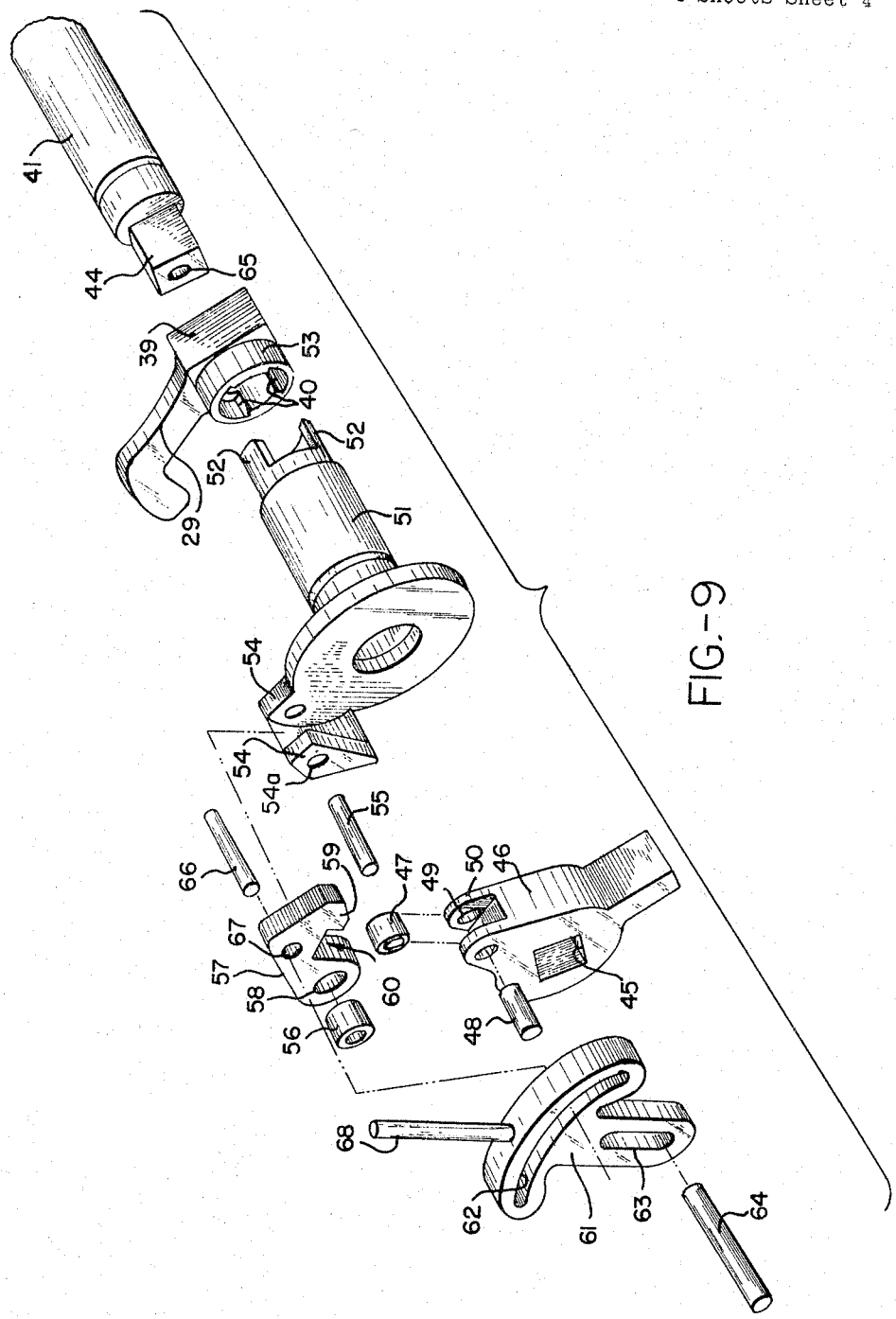

3,315,939
VALVE ACTUATING MECHANISM
Wallace D. Boone and James L. Hughes, Cincinnati, Ohio, assignors to Dover Corporation, Cincinnati, Ohio, a corporation of Delaware
Filed Sept. 11, 1964, Ser. No. 395,818
14 Claims. (Cl. 251—67)

This invention relates to an improved valve actuating mechanism.

It is well known that various valve mechanisms are provided for permitting an operator to manually open the valve means thereof to permit a flow of fluid therethrough, and, when the desired quantity of fluid has been dispensed through the valve means, to permit the operator to manually close the valve mechanism.

However, it has been found that in special applications of such valve mechanisms, the normal operator of such valve mechanisms is sometimes negligent in his operation thereof whereby it is desired to have a safety means for permitting another person or automatic equipment to override the operation of the valve mechanism to manually and remotely close the valve member thereof even though the primary operator is still attempting to continue the passage of fluid through the valve mechanism.

For example, one such application of the above described valve mechanism is when an operator desires to dispense gasoline and the like from large storage tanks into the storage tank of his gasoline truck or the like.

In such an application, it has been found that such gasoline truck drivers are negligent in their gasoline filling operation as they merely block the lever mechanisms in their opened positions whereby an overfilling operation may be provided because of the failure of the truck driver operators to determine when their gasoline trucks are filled.

However, according to the teachings of this invention, a central operator can be provided which can watch the truck filling operations from a control tower or the like and, when he sees an overfilling operation or other hazardous condition, such as a fire, etc., can automatically terminate the operation of the particular valve mechanism being hazardly operated by overriding the manual operation of the valve mechanism. In addition, the central operator in the tower can record the amount of gasoline dispensed by a particular valve mechanism as he has the control for rendering that valve mechanism operable.

In particular, this invention provides a housing means having an inlet and an outlet interconnected by a valve seat opened and closed by a movable valve member. The movable valve member is adapted to be moved between its opened and closed positions by a manual lever means adapted to be operated by the truck driver or the like in a conventional manner.

However, additional means are provided whereby a manually and remotely controlled movable means of the valve mechanism can be moved to one position thereof to disconnect the manual lever means from the valve member so that the valve member will automatically move to its closed position regardless of the position of the manual lever means.

Such manually and remotely controlled movable means of this invention also prevents the valve member from being moved from its opened position by the manual lever means as long as the manually and remotely controlled movable means is in one of its operating positions, the operating position of the manually and remotely controlled movable means being under the exclusive control of an operator other than the operator of the manual lever means.

However, it is to be understood that the valve mechanism of this invention can be so constructed and arranged that the operator of the manual lever means can also control the manually and remotely controlled movable means, if the above described safety factor is not desired.

Therefore, it is an object of this invention to provide an improved valving mechanism having one or more of the novel features of this invention as set forth above or hereinafter shown or described.

Other objects, uses and advantages of this invention are apparent from a reading of this description which proceeds with reference to the accompanying drawings forming a part thereof and wherein:

FIGURE 1 is a side view, partially broken away, illustrating the improved valve mechanism of this invention.

FIGURE 2 is an end view, partially broken away, taken in the direction of the arrow 2 in FIGURE 1.

FIGURE 3 is a cross-sectional view taken on line 3—3 of FIGURE 1.

FIGURE 4 is a fragmentary cross-sectional view illustrating various parts of the valve mechanism of this invention in one operating position thereof.

FIGURE 5 is a view similar to FIGURE 4 and illustrates the parts in another operating position thereof.

FIGURE 6 is an end view of certain of the parts of FIGURE 5.

FIGURE 7 is a view similar to FIGURE 3 and illustrates the valve member in its opened position.

FIGURE 8 is a view similar to FIGURE 7 and illustrates the valve member in its closed position.

FIGURE 9 is an exploded perspective view illustrating various parts of the valve operating mechanism of this invention.

While the various features of this invention are hereinafter described and illustrated as being particularly adaptable for operating a valve mechanism, it is to be understood that the various features of this invention can be utilized singly or in any combination thereof to provide operating means for other devices as desired.

Therefore, this invention is not to be limited to only the embodiment illustrated in the drawings, because the drawings are merely utilized to illustrate one of the wide variety of uses of this invention.

Referring now to FIGURES 1–3, the improved valve mechanism of this invention is generally indicated by the reference numeral 10 and comprises a housing means 11 formed of various parts assembled together and defining an inlet passage means 12 and an outlet passage means 13 interconnected together by a valve seat 14.

The valve seat 14 is adapted to be opened and closed by a movable valve member 15 having a resilient portion 16 for engaging the valve seat 14 to seal the inlet 12 from the outlet 13 in the manner illustrated in FIGURE 3.

The valve member 15 has a piston portion 17 slidably disposed in a cylinder defining means 18 having the upper end thereof closed by a cap-like portion 19 whereby the piston portion 17 of the valve member 15 cooperates with the cylinder defining member 18 to define a dash-pot chamber 20 therebetween.

The valve member 15 has a passage means 21 passing therethrough and interconnecting the outlet 13 with the dash-pot chamber 20.

However, a small movable valve member 22 is carried by the valve member 15 and is normally urged to its closed position to close the passage means 21 by a compression spring 23.

The small valve member 22 carries an enlargement 24 disposed beneath the valve member 15 and being utilized in a manner hereinafter described, the valve member 22 also carrying a yoke-like member 25 having a transversely disposed roller means 26 and a pin-like member 27 defining a slot 28 therebetween which receives a lever arm 29 for moving the valve member 15 from its closed position to its opened position in a manner hereinafter described when the lever arm 29 is moved about its axis of rotation 30 in a manner hereinafter described.

The cap-like member 19 of the dash-pot chamber 20 is provided with a passage means 31 interconnecting the exterior thereof with the dash-pot chamber 20 and normally receiving an adjusting member 32 to provide a variable restriction means in the passage means 31 for a purpose hereinafter described.

Another passage means 33 is formed through the cap-like member 19 and is normally closed by a valve member 34 urged to a closed position by a compression spring 35 disposed between the cap-like member 19 and an end 36 of a shaft-like member 37 interconnected to the valve member 34.

When it is desired to open the valve member 15 to interconnect the inlet 12 to the outlet 13, the lever arm 29 is rotated in a counterclockwise direction in FIGURE 3 in a manner hereinafter described from the position illustrated in FIGURE 3 to the position illustrated in FIGURE 7.

However, as the lever arm 29 is initially rotated in a counterclockwise direction, the same makes contact with the roller 26 and moves the valve member 22 upwardly off of its seat to interconnect the dash-pot chamber 20 with the outlet 13 whereby the dash-pot chamber 20 is interconnected to the outlet 13 as the valve member 15 is being moved to its open position.

In particular, after the valve member 22 has been moved upwardly a predetermined distance, the enlargement of 25 engages the underside of the valve member 15 and moves the same upwardly in opposition to the force of the compression spring 23 and flow pressure whereby the piston portion 17 of the valve member 15 is adapted to be telescoped within the cylinder defining means 18.

However, as the piston portion 17 is being telescoped into the cylinder defining means 18 as the valve member 15 is moving from its closed position to the opened position thereof, a shoulder 38 of the piston portion 17 abuts the end 36 of the shaft 37 and causes the valve member 34 to open the passage means 33 in opposition to the force of the small compression spring 35.

Thus, it can be seen that the valve member 15 is adapted to be moved to its opened position without being adversely affected by the dash-pot arrangement 20.

When it is desired to close the valve member 15 to prevent communication between the inlet 12 and the outlet 13, either the lever means 29 is moved in a clockwise direction in FIGURE 7 or the operator tending to hold the valve member 15 in the open position in opposition to the force of the compression spring 23 and flow releases his manually operated lever means (hereinafter described), the force of the compression spring 23 and flow tends to move the valve member 22 downwardly until the same seats on the passage means 21 and, thus, closes the dash-pot chamber 20 at the passage means 21 thereof.

Further movement of the valve member 22 downwardly under the force of the compression spring 23, moves the valve member 15 downwardly whereby the piston portion 17 thereof tends to untelescope with the cylinder defining means 18.

However, during such untelescoping of the piston portion 17 of the valve member 15 with the cylinder defining means 18, fluid is adapted to be drawn into the dash-pot chamber 20 because of the open valve member 34.

Eventually, the piston portion 17 untelescopes with the cylinder defining means 18 to such an extent that the valve member 34 is adapted to return to its closed position illustrated in FIGURE 3 by the force of the compression spring 35 whereby the flow of fluid into the increasing size of the chamber 20 is prevented by the closed valve member 34 so that the only fluid adapted to flow into the increasing chamber 20 is under the control of the restriction at the passage means 31 so that the final closing of the valve member 15 is under controlled conditions so that the valve member 15 will not close faster than desired.

Therefore, is can be seen that the dash-pot chamber 20 of the valve mechanism 10 of this invention is so controlled that the same readily permits the valve member 15 to be moved to its opened position while controlling the closing movement of the valve member 15 in a unique manner.

The details for opening and closing the valve member 15 according to the teachings of this invention will now be described.

As illustrated in FIGURES 1 and 9, the lever arm 29 extends outwardly from a hollow retainer portion 39 having a cylindrical projection 53 provided with a pair of keyways or slots 40.

A rotatable shaft 41 is adapted to pass through the retainer 39 of the lever arm 29 and be rotatably mounted to the housing means 11 by suitable bearing and sealing means 42 illustrated in FIGURE 1, the shaft-like member 41 being adapted to be rotated about the axis 30 by a manually movable lever means 43 disposed exteriorly of the housing means 11 in the manner illustrated in FIGURE 1.

The shaft 41 has a rectangular key portion 44 at the left end thereof which is adapted to be received in a complementary bore 45 passing through a latchable member 46 having a roller 47 rotatably mounted on a pin means 48 fastened in and extending between a pair of apertures 49 formed respectively in a pair of ears 50 projecting from the latching member 46.

Thus, it can be seen that as the shaft 41 is being rotated by the manually movable lever means 43, the latchable member 46 rotates therewith because of the keyed relation 44, 45 previously described.

A rotatable member 51 is disposed about the shaft 41 intermediate the latchable member 46 and the lever arm 39 and has a pair of lugs or ears 52 projecting from the right end thereof which are adapted to be received in the slots 40 in the sleeve projection 53 of the retainer 39 of the lever arm 29 so that the same are coupled together.

Thus, it can be seen that when the rotatable member 51 is rotated in a manner hereinafter described, the same causes like rotation of the lever arm 29 about the axis 30 of the shaft 41 to open and close the valve member 15 in the manner previously described.

The rotatable member 51 has a pair of spaced ears or lugs 54 interconnected together by a pin-like means 55 disposed in and extending between suitable apertures 54a formed in the ears 54, the pin-like means 55 carrying a rotatable bushing or bearing means 56 between the lugs or ears 54.

A latch member 57 receives the bearing or bushing 56 in an aperture 58 thereof whereby the latch member 57 is pivotally mounted to the rotatable member 51, the latch member 57 having a bent over tongue 59 defining a notch 60 adapted to receive the bushing 47 of the latchable member 57 in a manner hereinafter described.

A movable part 61 is provided and is adapted to move vertically upwardly and downwardly in FIGURES 1 and 2 for a purpose hereinafter described, the movable part 61 having an arcuate slot 62 and a vertically disposed slot 63 passing respectively therethrough.

The vertically disposed slot 63 of the movable part 61 receives a pin-like member 64 projecting from an aperture 65 in the left end of the shaft 41 in the manner illustrated in FIGURES 1 and 2 whereby vertical movement of the movable part 61 is guided by the pin means 64.

Another pin-like means 66 is provided and is carried in an aperture 67 of the latch member 57, the pin-like member 66 projecting into the arcuate slot 62 of the part 61.

The part 61 has a shaft-like member 68 projecting upwardly therefrom and passing through suitable sealing means 69 (FIGURE 2) in an auxiliary housing 70 carried by the housing means 11 of the valving mechanism 10, the housing means 70 carrying a conventional electrical solenoid 71' having a movable armature resiliently interconnected to the shaft 68 of the movable part 61.

The armature 71 of the electrical solenoid 71' is normally urged to an upward position by a compression spring 72 (FIGURES 4 and 5) whereby when the solenoid 71' is deenergized in a manner hereinafter described, the part 61 is moved vertically upwardly to the position illustrated in FIGURE 4 to cause the valve member 15 to automatically move to its closed position, should the same be in its open position, and disconnect the manual lever means 43 from operating the lever arm 29 in a manner now to be described.

The solenoid 71' in the housing means 70 is adapted to be energized and deenergized at any desired location. For example, the means for energizing and deenergizing the solenoid 71' in the housing 70 can comprise a manual switch in a tower location or the like whereby an operator in the tower can remotely control the operation of the valving mechanism 10 in a manner hereinafter described for the reasons previously described.

However, it is to be understood that the solenoid 71' of this invention can also be remotely controlled by a key operated or card operated mechanism carried by the valving mechanism 10 if desired if the second operator safety condition is not desired.

In any event, when the solenoid 71' in the housing 70 is deenergized, the part 61 is moved vertically upwardly so that the latch member 57 is moved vertically upwardly above the latchable member 46 so that the bushing 47 of the latchable member 46 is no longer disposed in the notch 60 of the latch member 57.

Under these conditions, should a person try to rotate the manually operated lever means 43 and tend to move the same to a position to open the valve member 15, it can be seen that the shaft 41 will be rotated by the lever 43.

However, the latchable member 40 will be rotated with the shaft 41 and will not be interconnected to the rotatable member 51 by the latch member 57 whereby such rotation of the shaft member 41 will not affect the position of the lever arm 29 so that the valve member 15 remains in its closed position.

However, should the lever arm 43 be disposed in its normally closed position, and the solenoid 71' in the housing 70 be subsequently energized in any of the above manners, the part 61 is moved vertically downwardly by the solenoid 71' and carries the latch member 57 therewith so that the latch member 57 is disposed around the bushing 47 of the latchable manner 46 to interconnect the latchable member 46 to the rotatable member 51 which is directly connected to the lever arm 29.

Thus, with the part 61 in its lowered vertical position, it can be seen that the operator can grasp the lever 43 and rotate the same in the proper direction to move the valve member 15 from its closed position to its opened position in the manner previously described because rotation of the shaft 41 causes rotation of the latchable member 46 and, through the lowered latch member 57, causes like rotation of the rotatable member 51 whereby the lever arm 29 is moved in a counterclockwise direction in FIGURE 7 to open the valve member 15 in the manner previously described.

Thus, as long as the lever means 43 is held in its open position in opposition to the force of the biasing means 23, fluid is adapted to flow from the inlet 12 of the valving mechanism 10 through the outlet 13 thereof as long as the solenoid 71' is energized.

However, should someone or automatic equipment means controlling the solenoid 71' decide that the valve member 15 of the particular valving mechanism 10 be closed, even though the lever arm 43 is disposed in its open position and holding the valve member 15 in its open position, that person or equipment means deenergizes the solenoid 71' whereby the force of the compression spring 69 moves the part 61 vertically upwardly to unlatch the latch member 57 from the latchable member 46.

In this situation, the force of the biasing means 23 tending to close the valve member 15 is unresisted by the shaft member 41 being held in a particular position because the latchable member 46 is now detached from the rotatable member 51 by the upwardly moved latch member 57 whereby the force of the biasing means 23 closes the valve member 15 in the manner previously described even though the shaft 41 is being held in its opened position by the lever arm 43.

Thus, it can be seen that whenever the solenoid 71' is deenergized, the valve member 15 is automatically returned to its closed position and remains in its closed position regardless of the position of the lever means 43 until the solenoid 71' is again energized.

However, in order to again interconnect the lever 43 to the lever arm 29 by the energized solenoid 71', the lever arm 43 must be returned to its normally closed position so that the latch member 57 can latch with the bushing 47 of the latchable member 46 to permit the lever arm 43 to again open the valve member 15.

While the movable part 61 of this invention has been previously described as being moved by the solenoid 71', it is to be understood that the movable part 61 could be moved by other actuating means, such a pneumatic means or the like, if desired, the actuating means being remotely and manually controlled for the reasons previously described.

Therefore, it can be seen that this invention provides an improved valving mechanism having manually and remotely controlled means for rendering a manual lever means inoperative as desired.

While the form of the invention now preferred has been disclosed as required by the statutes, other forms may be used, all coming within the scope of the claims which follow.

What is claimed is:

1. In combination, a housing means having an inlet and an outlet interconnected together by a valve seat, a movable valve member for opening and closing said valve seat, means normally tending to move said valve member to its closed position, manual lever means for moving said valve member to its open position in opposition to said first-named means, and manually and remotely controlled movable means for coupling said manual lever means with said valve member, said movable means when in one position disconnecting said manual lever means from said valve member whereby said first-named means closes said valve member regardless of the position of said manual means, said movable means including a movable part having an arcuate slot therein and a latch member having a pin connection projecting into said slot, said latch member being adapted to interconnect said manual lever means with said valve member when said movable part is in a position other than said one position thereof.

2. A combination as set forth in claim 1 wherein said remotely controlled movable means must be in said one position thereof before said manual lever means can be moved to open said valve member.

3. A combination as set forth in claim 1 wherein said manual lever means can be manually moved when said movable means is in a position other than said one position thereof without opening said valve member.

4. A combination as set forth in claim 1 wherein said manually and remotely controlled movable means includes an electrical solenoid to move a movable part of said movable means.

5. In combination, a housing means having an inlet and an outlet interconnected together by a valve seat, a movable valve member for opening and closing said valve seat, means normally tending to move said valve member to its closed position, manual lever means for moving said valve member to its open position in opposition to said first-named means, a movable part having a closed slot therein, a latch member having a portion thereof carried in said slot whereby said latch member is moved to a locking position and operable by said manual lever means when said part is in one position thereof and said latch member is moved to an unlocking position and unoperable by said manual lever means when said part is in another position thereof, and connection means interconnecting said latch member with said valve member whereby said manual lever means can move said valve member when said part is in said one position thereof and said first-named means can move said valve member to the closed position thereof when said part is moved to said other position thereof.

6. A combination as set forth in claim 5 wherein an electrical solenoid moves said part between the positions thereof.

7. A combination as set forth in claim 6 wherein said part is moved to said one position thereof when said solenoid is energized.

8. A combination as set forth in claim 6 wherein said solenoid moves said part to said other position thereof when said solenoid is deenergized.

9. A combination as set forth in claim 6 wherein said solenoid is manually and remotely controlled.

10. In combination, a housing means having an inlet and an outlet interconnected together by a valve seat, a movable valve member for opening and closing said valve seat, means normally tending to move said valve member to its closed position, manual lever means for moving said valve member to its open position in opposition to said first-named means, a movable part having a closed slot therein, a latch member having a portion thereof carried in said slot whereby said latch member is moved to a locking position and operable by said manual lever means when said part is in one position thereof and said latch member is moved to an unlocking position and unoperable by said manual lever means when said part is in another position thereof, and a rotatable member connecting said latch member with said valve member whereby said manual lever means can rotate said rotatable member to move said valve member when said part is in said one position thereof and said first-named means can move said valve member to its closed position thereof and rotate said movable member when said part is moved to said other position thereof regardless of the position of said manual lever means.

11. A combination as set forth in claim 10 wherein said latch member is pivotally mounted to said rotatable member.

12. A combination as set forth in claim 11 wherein said manual lever means includes a rotatable shaft rotatably passing through said rotatable member.

13. A combination as set forth in claim 12 wherein said shaft has a latchable member fixed thereto to be latched and unlatched by said latch member.

14. A combination as set forth in claim 12 wherein said part has another slot therein and wherein said shaft has means projecting into said other slot to guide movement of said part between its operating positions.

References Cited by the Examiner

UNITED STATES PATENTS

| | | | |
|---|---|---|---|
| 2,218,606 | 10/1940 | Foster | 251—69 |
| 2,301,876 | 10/1942 | Hurlburt | 251—69 |
| 2,839,929 | 6/1958 | Hurlburt | 251—69 X |
| 3,082,627 | 3/1963 | Yeo et al. | 251—69 X |
| 3,094,004 | 6/1963 | Berck | 251—67 X |
| 3,134,271 | 5/1964 | Ray | 251—68 X |

M. CARY NELSON, *Primary Examiner.*

R. C. MILLER, *Assistant Examiner.*